US 6,740,690 B2

(12) United States Patent
Nakano et al.

(10) Patent No.: US 6,740,690 B2
(45) Date of Patent: May 25, 2004

(54) WATER-BASED INK COMPOSITION

(75) Inventors: Yukihiro Nakano, Wakayama (JP); Fumihide Shiga, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/900,172

(22) Filed: Jul. 9, 2001

(65) Prior Publication Data

US 2002/0016385 A1 Feb. 7, 2002

(30) Foreign Application Priority Data

Jul. 10, 2000 (JP) .................................. 2000-209012

(51) Int. Cl.[7] ........................ C09D 11/10; C08K 5/09; C08K 5/092
(52) U.S. Cl. ........................ 523/160; 524/284
(58) Field of Search .................. 523/160, 161; 524/284, 556, 560, 588, 577

(56) References Cited

U.S. PATENT DOCUMENTS

| | | | | | |
|---|---|---|---|---|---|
| 4,623,689 | A | * | 11/1986 | Shintani et al. | 524/457 |
| 5,271,765 | A | * | 12/1993 | Ma | 524/83 |
| 5,529,616 | A | * | 6/1996 | Prasad | 524/389 |
| 5,713,993 | A | * | 2/1998 | Grezzo Page et al. | 106/31.85 |
| 5,852,074 | A | * | 12/1998 | Tsutsumi et al. | 523/161 |
| 6,153,001 | A | * | 11/2000 | Suzuki et al. | 106/31.65 |
| 6,211,265 | B1 | * | 4/2001 | Ohta et al. | 523/160 |
| 6,232,369 | B1 | * | 5/2001 | Ma et al. | 523/161 |
| 6,281,267 | B2 | * | 8/2001 | Parazak | 523/160 |
| 6,319,309 | B1 | * | 11/2001 | Lavery et al. | 106/31.27 |

FOREIGN PATENT DOCUMENTS

| | | |
|---|---|---|
| EP | 0 719 846 | 7/1996 |
| EP | 0 826 751 | 3/1998 |
| EP | 0 909 798 | 4/1999 |
| EP | 1088863 A1 * | 4/2001 |
| JP | 8-183920 | 7/1996 |
| JP | 9-241565 | 9/1997 |
| JP | 10-7968 | 1/1998 |
| JP | 10-67957 | 3/1998 |
| JP | 10-88053 | 4/1998 |
| JP | 10-140065 | 5/1998 |
| JP | 10-279873 | 10/1998 |
| JP | 11-80636 | 3/1999 |
| JP | 11-246806 | 9/1999 |
| JP | 11-269418 | 10/1999 |
| JP | 11-315229 | 11/1999 |

* cited by examiner

*Primary Examiner*—Callie Shosho
(74) *Attorney, Agent, or Firm*—Oblon, Spivak, McClelland, Maier & Neustadt, P.C.

(57) ABSTRACT

A water-based ink composition comprising a polybasic acid, an ionic polymer and a coloring agent. The water-based ink composition is used for a water-based ink for inkjet recording.

34 Claims, No Drawings

WATER-BASED INK COMPOSITION

BACKGROUND OF THE INVENTION

1. Field of the Invention

The present invention relates to a water-based ink composition, and more specifically to a water-based ink composition which can be suitably used for a water-based ink for inkjet recording.

2. Discussion of the Related Art

As a colorant for a water-based ink composition, a water-soluble dye or an aqueous pigment dispersion has been used. In the case of the water-soluble dye, however, the ink composition is poor in water resistance and light fastness. Also, in the case of the aqueous pigment dispersion, an ink composition obtained has a high degree of coloration, but the ink composition is poor in fixing ability on a paper surface, rubbing resistance and high-lighter fastness.

For the purposes of improving water resistance and fixing ability, there has been proposed a use of an aqueous dispersion of polymer particles containing a dye or pigment and a water-insoluble polymer as a colorant as disclosed in Japanese Patent Laid-Open Nos. Hei 8-183920 and Hei 10-140065.

However, in order to improve water resistance or fixing ability to a sufficiently satisfiable level, the water-insoluble polymer should be usually used in an amount of not less than 40% by weight based on the entire colorant. Therefore, when the amount of the colorant in the ink is adjusted to the same amount as a conventional water-soluble dye or pigment dispersion ink, there is a defect that printed density is relatively lowered because the content of the coloring agent, namely the dye or pigment in the ink, is so low.

In view of the above prior art, there has been proposed the addition of polymer particles containing a dye or pigment to an ink composition in a large amount in order to increase printed density. In this process, however, the viscosity of the ink composition increases. Therefore, when the ink is used as a water-based ink for inkjet printing, jetting failure is sometimes caused by the increased viscosity, so that the amount of the polymer particles containing a dye or pigment in an ink is inevitably restricted.

An object of the present invention is to provide a water-based ink composition excellent in printed density, water resistance, high-lighter fastness and rubbing resistance.

Another object of the present invention is to provide a water-based ink for inkjet printing excellent in jetting ability.

These and other objects of the present invention will be apparent from the following description.

SUMMARY OF THE INVENTION

According to the present invention, there is provided a water-based ink composition comprising a polybasic acid, an ionic polymer and a colorant.

DETAILED DESCRIPTION OF THE INVENTION

When the polybasic acid and the ionic polymer are used for a water-based ink composition, printed density of the water-based ink composition is remarkably increased. It is thought that this phenomenon would be based upon the followings: During the course of jetting a water-based composition on paper to permeate the water-based ink composition into the paper, the paper absorbs water contained in the water-based ink composition. Therefore, the concentration of the water-based ink composition increases to a high level, resulting in that the ionic polymer and/or the ionic polymer particle containing a coloring agent [hereinafter referred to as "ionic polymer (particle)"], contained in the water-based ink composition, is rapidly and strongly aggregated by the polybasic acid. Therefore, the coloring agent finally remains on the surface of the paper in a large amount, so that high printed density is exhibited.

On the other hand, when the polybasic acid and the ionic polymer (particle) are contained in the water-based ink composition, it is apprehensive that storage stability of the water-based ink composition would be lowered. However, the storage stability can be increased by controlling the kinds or concentration of the polybasic acid and the kinds or concentration of the ionic polymer (particle), which are contained in the water-based ink composition.

Also, the polybasic acid can be used as a neutralizing agent for the cationic polymer (hereinafter referred to as "the use of polybasic acid as a neutralizing agent"). Alternatively, the cationic polymer is neutralized with a monovalent acid or the combination of the monovalent acid and the polybasic acid, and thereafter the polybasic acid can be further added to the neutralized cationic polymer (hereinafter referred to as "the further addition of polybasic acid."). When the polybasic acid is used as a neutralizing agent, the neutralization degree, that is, the percentage of the neutralized salt-forming group in the salt-forming group of the ionic polymer is preferably not more than 30% by mol, more preferably not more than 20% by mol, from the viewpoint of storage stability.

In the case of the further addition of polybasic acid, the pH of the ink composition is preferably not less than 3, more preferably not less than 4, from the viewpoint of corrosion resistance of the metal members in the head. In addition, the pH of the ink composition is preferably not more than 7, more preferably not more than 6, from the viewpoint of storage stability. Specifically, the pH of the ink composition is preferably 3 to 7, more preferably 4 to 6. In this case, the amount of the polybasic acid is preferably not more than 2 mol, more preferably not more than 1 mol, per one mol of the ionic functional group of the cationic polymer. The amount of the polybasic acid is prioritized over the pH of the ink composition.

In the case of the further addition of polybasic acid, when the cationic polymer is neutralized with the combination of the monovalent acid and the polybasic acid, the neutralization degree based upon the polybasic acid is preferably not more than 30% by mol, more preferably not more than 20% by mol, from the viewpoint of storage stability.

When the anionic polymer is neutralized and thereafter the polybasic acid is further added to a neutralized anionic polymer, it is preferable that the polybasic acid is added to the neutralized anionic polymer so that the pH of the ink composition becomes not less than 6, preferably not less than 7, still more preferably not less than 8, from the viewpoint of storage stability. In addition, the pH of the ink composition is preferably not more than 12, more preferably not more than 10, still more preferably not more than 9, from the viewpoint of corrosion resistance of the metal members in the head. Specifically, the pH of the ink composition is preferably 6 to 12, more preferably 7 to 10, still more preferably 8 to 9. In this case, the amount of the polybasic acid is preferably not more than 2 mol, more preferably not more than 1 mol, per one mol of the ionic functional group of the anionic polymer. The amount of the polybasic acid is prioritized over the pH of the ink composition.

The term "polybasic acid" is intended to mean an acid having two or more acidic groups. The polybasic acid can be any of organic acids and inorganic acids.

The organic acid includes, for instance, oxalic acid, malonic acid, glutaconic acid, glutaric acid, tartronic acid, pimelic acid, succinic acid, DL-malic acid, tartaric acid, citric acid, trimellitic acid, polyethylene oxide (n=2 to 60) dicarboxylic acids, glycerol dicarboxylic acids, polyglycerol (n=2 to 10) dicarboxylic to decacarboxylic acids and the like.

The inorganic acid includes, for instance, carbonic acid, sulfuric acid, sulfonic acid, phosphoric acid, pyrophosphoric acid, tripolyphosphoric acid, phosphonic acid and the like.

Among the polybasic acids, polybasic organic acids having a water solubility of not less than 1% by weight at 20° C., preferably not less than 10% by weight, more preferably not less than 50% by weight are desirable, from the viewpoints of dispersion stability and jetting stability of the ink composition. Preferred examples of the polybasic organic acid are oxalic acid, malonic acid, polyethylene oxide dicarboxylic acids, the number of moles of ethylene oxide of which is 2 to 30, glycerol dicarboxylic acids and the like.

In the case of the water-based ink composition containing the cationic polymer as an ionic polymer, dispersion stability of the water-based ink composition can be further improved by adding a monovalent acid having a water solubility of not less than 10% by weight at 20° C. to the water-based ink composition.

The monovalent acid can be any of organic acids and inorganic acids.

The monovalent organic acid includes, for instance, acetic acid, methoxyacetic acid, propionic acid, gluconic acid, glycolic acid, lactic acid, polyethylene oxide (n=2 to 60) monocarboxylic acids, glycerol monocarboxylic acids and the like. The monovalent inorganic acid includes, for instance, hydrochloric acid, nitric acid, nitrous acid and the like.

Among the monovalent acids, it is preferable to use monovalent organic acids, in particular acetic acid, methoxyacetic acid, gluconic acid, glycolic acid, glycerol monocarboxylic acids and polyethylene oxide (n=2 to 60) monocarboxylic acids, from the viewpoint of jetting stability.

It is desired that the amount of the monovalent acid is not more than 400 parts by weight, preferably not more than 200 parts by weight, more preferably not more than 100 parts by weight, based on 100 parts by weight of the acid having two or more acidic groups, from the viewpoints of the balance between an effect exhibited by the acid having two or more acidic groups and storage stability. In the case where the monovalent acid is added, it is also preferable that the pH of the water-based ink composition is within the range specified above.

The ionic polymer can be a water-soluble polymer or a polymer in the form of polymer emulsion. The polymer emulsion may contain a coloring agent.

It is preferable that the ionic polymer has a characteristic of increasing printed density by the combined use of the polybasic acid, preferably functioning as a jetting improving agent or a fixing improving agent of a coloring agent.

The ionic polymers include cationic polymers and anionic polymers. Among them, the cationic polymers are preferable, from the viewpoint of giving a water-based ink composition improved printed density by coexistence with the polybasic acid. Representative examples of the ionic polymers include vinyl polymers, ester-based polymers, urethane-based polymers and the like. Among them, the vinyl polymers are preferable.

The content of the ionic polymer in the water-based ink composition is not limited to specified ones, as long as the water-based ink composition has improved jetting ability and increased printed density. It is desired that the content of the ionic polymer in the water-based ink composition is usually 0.01 to 20% by weight, preferably 0.05 to 10% by weight, more preferably 0.1 to 8% by weight.

As the starting monomers for the cationic polymer, the cationic monomer can be used.

Representative examples of the cationic monomer include tertiary amine-containing unsaturated monomers, ammonium salt-containing unsaturated monomers and the like. Concrete examples of the monomer include N,N-dimethylaminoethyl (meth)acrylate, N-(N',N'-dimethylaminopropyl) (meth)acrylamide, vinylpyrrolidone, methacroyloxyethyltrimethylammonium methylsulfate, methacroyloxyethyldimethylethylammonium ethylsulfate and the like. Among them, N,N-dimethylaminoethyl (meth) acrylate is preferable.

As the starting monomers for preparing the anionic polymer, the anionic monomer can be used. Representative examples of the anionic monomer include unsaturated carboxylic acid monomers, unsaturated sulfonic acid monomers, unsaturated phosphoric acid monomers and the like. Among them, the unsaturated carboxylic acid monomers are preferable, and acrylic acid and methacrylic acid are more preferable.

In addition, as the monomers for preparing the cationic polymer or anionic polymer, in addition to the cationic or anionic monomer, there can be used a monomer copolymerizable with these ionic monomers.

The monomer copolymerizable with these ionic monomers includes (meth)acrylic acid esters which may have an aliphatic group having 1 to 30 carbon atoms, an alicyclic ring having 3 to 30 carbon atoms, an aromatic having 6 to 20 carbon atoms or a hetero-atom; styrenic monomers such as styrene, vinyltoluene, 2-methylstyrene and chlorostyrene; hydroxyl group-containing monomers such as 2-hydroxyethyl (meth)acrylate and 2-hydroxypropyl (meth) acrylate; macromers such as styrenic macromers and silicone macromers;

an alkylene oxide group-containing monomer represented by the formula (I):

$$CH_2=C(R^1)COO(R^2O)_pR^3 \qquad (I)$$

wherein $R^1$ is hydrogen atom or a lower alkyl group having 1 to 4 carbon atoms; $R^2$ is a divalent hydrocarbon group having 1 to 30 carbon atoms which may have a hetero-atom; $R^3$ is hydrogen atom or a monovalent hydrocarbon group having 1 to 30 carbon atoms which may have a hetero-atom; and p is a number of 1 to 60; and the like. The styrenic macromer and the silicone macromer win be specifically explained in the explanation of the component (b) of the vinyl polymer, that is, macromer (b).

In the formula (I), the preferable hetero-atom is an atom other than carbon, more specifically oxygen atom, sulfur atom, a halogen atom, nitrogen atom or phosphorus atom. In addition, the hydrocarbon group may be any of an aromatic hydrocarbon group and a saturated or unsaturated, linear or branched aliphatic hydrocarbon group.

Representative examples of $R^2$ include an aromatic ring having 6 to 30 carbon atoms which may have a substituent; a heterocyclic ring having 3 to 30 carbon atoms which may have a substituent; and an alkylene group having 1 to 30 carbon atoms which may have a substituent. Also, these rings or groups may be used in combination of not less than two kinds. The substituent includes an aromatic ring having 6 to 29 carbon atoms; a heterocyclic ring having 3 to 29 carbon atoms; an alkyl group having 1 to 29 carbon atoms; a halogen atom; amino group and the like.

Preferred examples of $R^2$ include phenylene ring which may have a substituent having 1 to 24 carbon atoms; an aliphatic alkylene group having 1 to 30 carbon atoms, preferably 1 to 20 carbon atoms; an aromatic ring-containing alkylene group having 7 to 30 carbon atoms; and a heterocyclic ring-containing alkylene group having 4 to 30 carbon atoms.

In addition, preferred examples of $R^2O$ include alkylene oxide groups having 2 to 7 carbon atoms such as ethylene oxide group, (iso)propylene oxide 20 group, tetramethylene oxide group, heptamethylene oxide group, hexamethylene oxide group, and combinations of at least two of these alkylene oxide groups; and phenylene oxide group.

Representative examples of $R^3$ include hydrogen atom, an aromatic ring having 6 to 30 carbon atoms which may have a substituent; a heterocyclic ring having 3 to 30 carbon atoms which may have a substituent; and an alkyl group having 1 to 30 carbon atoms which may have a substituent. The substituent includes an aromatic ring having 6 to 29 carbon atoms; a heterocyclic ring having 4 to 29 carbon atoms which may have a substituent; a halogen atom; amino group and the like.

Preferred examples of $R^3$ include hydrogen atom, phenyl group, an aliphatic alkyl group having 1 to 30 carbon atoms, preferably 1 to 20 carbon atoms, an aromatic ring-containing alkyl group having 7 to 30 carbon atoms, and a heterocyclic ring-containing alkyl group having 4 to 30 carbon atoms.

More preferred examples of $R^3$ include hydrogen atom; alkyl groups having 1 to 6 carbon atoms such as methyl group, ethyl group, (iso)propyl group, (iso)butyl group, (iso)pentyl group and (iso)hexyl group; phenyl group and the like.

In the formula (I), p is a number of 1 to 60, out of which a number of 1 to 30 is preferable.

Concrete examples of the monomer represented by the formula (I) include methoxypolyethylene glycol (1–30: p value in the formula (I), hereinafter referred to the same) (meth)acrylates, methoxypolytetramethylene glycol (1–30) (meth)acrylates, ethoxypolyethylene glycol (1–30) (meth) acrylates, (iso)propoxypolyethylene glycol (1–30) (meth) acrylates, butoxypolyethylene glycol (1–30) (meth) acrylates, methoxypolypropylene glycol (1–30) (meth) acrylates, methoxy(ethylene glycol-propylene glycol copolymer) (1–30, out of which ethylene glycol: 1–29) (meth)acrylates and the like. Those monomers can be used alone or in admixture of not less than two kinds. Among them, methoxypolyethylene glycol (1–30) (meth)acrylates are preferable.

The term "(meth)acrylate" as used herein means acrylate or methacrylate. Also, the term "(iso)propoxy" as used herein means n-propoxy or isopropoxy.

The monomer copolymerizable with the ionic monomer can be copolymerized with the ionic monomer in accordance with the desired purposes.

For instance, there can be used at least one monomer selected from group consisting of the hydroxyl group-containing monomers and the alkylene oxide group-containing monomers in order to improve the jetting ability. In this case, it is desired that the content of the monomer in the ionic polymer is 0.5 to 80% by weight, preferably 2 to 50% by weight, from the viewpoints of water resistance and fixing ability.

In order to improve the fixing of the coloring agent, at least one monomer selected from the group consisting of styrenic monomers and (meth)acrylic acid ester monomers can be used. In this case, it is desired that the content of the monomer in the ionic polymer is 5 to 90% by weight, preferably 10 to 70% by weight, from the viewpoints of jetting ability, water resistance and fixing ability.

After the polymerization of the ionic monomers, the ionic monomer component can be neutralized. Alternatively, the ionic monomers are neutralized, and thereafter the neutralized ionic monomers can be polymerized.

As an acid used as a neutralizing agent of the cationic monomer component after the polymerization or the cationic monomer, there can be used any of organic acids and inorganic acids.

The organic acid includes, for instance, monovalent acids such as acetic acid, methoxyacetic acid, propionic acid, gluconic acid, glycolic acid, glycerol monocarboxylic acids, lactic acid, polyethylene oxide (n=2 to 30) monocarboxylic acids and the like. When the neutralization degree is not more than 30% by mol, there can be used malonic acid, a glycerol dicarboxylic acid or a polyethylene oxide (n=2 to 30) dicarboxylic acid, preferably a glycerol dicarboxylic acid or a polyethylene oxide (n=2 to 30) dicarboxylic acid. Among the organic acids, acetic acid, methoxyacetic acid, propionic acid, gluconic acid, glycolic acid, glycerol monocarboxylic acids and lactic acid are preferable, from the viewpoints of dispersion stability and jetting ability.

The inorganic acid includes, for instance, hydrochloric acid, sulfuric acid, nitric acid, nitrous acid and the like.

The neutralizing agent for the anionic monomer component or the anionic monomer includes tertiary amines such as triethylamine and trimethylamine; and bases such as ammonium, sodium hydroxide and potassium hydroxide. The neutralization degree is not limited to specified ones.

It is desired that the neutralization degree is 50 to 200% by mol, preferably 70 to 130% by mol, more preferably 100% by mol of the ionic monomer component or the ionic monomer, from the viewpoint of storage stability.

The coloring agent includes pigments, dyes and the like.

The pigments can be any of known inorganic pigments and organic pigments. In addition, those pigments can be used together with an extender as occasion demands.

The inorganic pigment includes carbon black, metal oxides, metal sulfides, metal chlorides and the like. Among them, carbon black is preferable for a black water-based ink. The carbon black includes furnace black, thermal lamp black, acetylene black, channel black and the like.

The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like. The extender includes silica, calcium carbonate, talc and the like.

The dyes can be any of hydrophobic dyes and water-soluble dyes. The hydrophobic dye is preferable when the dye is contained in a water-insoluble polymer.

Examples of the hydrophobic dye include oil-soluble dyes, disperse dyes and the like. Among them, the oil-soluble dyes and the disperse dyes can be preferably used because these dyes can be favorably contained in the polymer particles.

The oil-soluble dyes are not limited to specified ones. The oil-soluble dyes include, for instance, C. I. Solvent Black 3, 7, 27, 29, 34; C. I. Solvent Yellow 14, 16, 29, 56, 82; C. I. Solvent Red 1, 3, 8, 18, 24, 27, 43, 51, 72, 73; C. I. Solvent Violet 3; C. I. Solvent Blue 2, 11, 70; C. I. Solvent Green 3, 7; C. I. Solvent Orange 2; and the like.

The disperse dyes are not limited to specified ones. Preferred examples include C. I. Disperse Yellow 5, 42, 54, 64, 79, 82, 83, 93, 99, 100, 119, 122, 124, 126, 160, 184:1, 186, 198, 199, 204, 224, 237; C. I. Disperse Orange 13, 29, 31:1, 33, 49, 54, 55, 66, 73, 118, 119, 163; C. I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, 368; C. I. Disperse Green 6:1, 9; and the like.

It is desired that the solubility of the hydrophobic dye is not less than 2 g/L, preferably 20 to 500 g/L in an organic solvent at 20° C., from the viewpoint of efficiently encapsulating the hydrophobic dye into the water-insoluble polymer particles described below.

The water-soluble dyes include direct dyes, acidic dyes, basic dyes, reactive dyes, food dyes and the like.

It is preferable that 0.5 to 20% by weight of the coloring agent and 0.1 to 20% by weight of the ionic polymer are contained in the water-based ink composition, from the viewpoints of printed density and rubbing resistance.

A first embodiment of the coloring agent is an aqueous pigment dispersion prepared by dispersing a water-soluble dye or pigment in water with a dispersing agent, or an aqueous dispersion of a self-dispersible pigment. In the first embodiment, the ionic polymer can be a water-soluble polymer and/or a polymer emulsion. In addition, the polymer emulsion may contain a coloring agent.

A second embodiment of the coloring agent is an aqueous pigment dispersion of a water-soluble polymer, or an aqueous dispersion of water-insoluble polymer particles comprising a water-insoluble polymer and a pigment and/or a dye. In the second embodiment, the water-soluble polymer or the water-insoluble polymer is an ionic polymer. The aqueous dispersion of the water-insoluble polymer particles is a polymer emulsion containing a pigment and/or a dye. The aqueous dispersion of the water-insoluble polymer particles containing a pigment and/or a dye can be favorably used, from the viewpoints of water resistance and fixing ability.

In the second embodiment, it is preferable to add an ionic water-soluble polymer and/or an ionic polymer emulsion to the aqueous dispersion, from the viewpoints of giving a water-based ink composition having improved water resistance, high-lighter fastness and rubbing resistance. In this case, it is preferable that the content of the coloring agent in the water-based ink composition is 0.5 to 20% by weight, and that the content of the ionic polymer in the water-based ink composition is 0.1 to 20% by weight, from the viewpoints of printed density and rubbing resistance.

The aqueous pigment dispersion prepared by dispersing a water-soluble dye or pigment in water with a dispersing agent includes those prepared by dispersing a pigment with an anionic surfactant, a cationic surfactant, a nonionic surfactant or an amphoteric surfactant. The aqueous dispersion of a self-dispersible pigment includes those prepared by subjecting a dye derivative having an ionic group to an adsorption treatment to a pigment surface; those prepared by subjecting a pigment surface to a chemical treatment with an oxidizing agent or reducing agent; and the like. The water-soluble polymer used in the aqueous pigment dispersion of a water-soluble polymer is preferably the above-mentioned ionic polymer.

The water-insoluble polymer used for the aqueous dispersion of the water-insoluble polymer particles containing a pigment and/or a dye includes vinyl polymers, ester-based polymers, urethane-based polymers and the like. Among these polymers, the vinyl polymers are preferable.

As the vinyl polymer, a vinyl polymer prepared by copolymerizing a monomer mixture comprising (a) a monomer having a salt-forming group [hereinafter referred to as component (a)], (b) a macromer [hereinafter referred to as component (b)] and (c) a monomer copolymerizable with the monomer having a salt-forming group and the macromer [hereinafter referred to as component (c)] is preferable, more preferably a vinyl polymer prepared by copolymerizing the above-mentioned monomer mixture with a monomer mixture comprising (d) a hydroxyl group-containing monomer [hereinafter referred to as component (d)], and (e) a monomer represented by the above formula (I) [hereinafter referred to as component (e)].

The component (a) includes cationic monomers, anionic monomers and the like. The cationic monomers and the anionic monomers may be the same ones as those exemplified as the above-mentioned ionic polymer. Among them, N,N-dimethylaminoethyl (meth)acrylate, N-(N',N'-dimethylaminopropyl) (meth)acrylamide, vinylpyrrolidone, acrylic acid and methacrylic acid are preferable.

The component (b) includes macromers having a polymerizable unsaturated group and a number-average molecular weight of preferably 500 to 100000, more preferably 1000 to 20000, still more preferably 1000 to 10000. Among them, a silicone macromer represented by the formula (VIII):

$$X^1(Y^1)_{q1}Si(R^4)_{3-r1}(Z^1)_{r1} \quad (VIII)$$

wherein $X^1$ is a polymerizable unsaturated group; $Y^1$ is a divalent group; each of $R^4$ is independently hydrogen atom, a lower alkyl group, an aryl group or an alkoxy group; $Z^1$ is a monovalent siloxane polymer residue having a number-average molecular weight of not less than 500; $q_1$ is 0 or 1; and r is an integer of 1 to 3, and/or a styrenic macromer having a polymerizable functional group at one end is preferable.

The number-average molecular weight of the component (b) is determined by gel chromatography using polystyrene as a standard substance and chloroform containing 1 mmol/L of dodecyldimethylamine as a solvent.

The silicone macromer can be favorably used from the viewpoint of preventing scorching on printer heads of inkjet printers.

In the silicone macromer represented by the formula (VIII), $X^1$ includes a monovalent unsaturated hydrocarbon group having 2 to 6 carbon atoms, such as $CH_2=CH-$ group and $CH_2=C(CH_3)-$ group. $Y^1$ includes divalent groups such as $-COO-$ group, a $-COOC_{a1}H_{2a1}-$ group, wherein $a_1$ is an integer of 1 to 5, and phenylene group. Among them, $-COOC_3H_6-$ is preferable. $R^4$ includes hydrogen atom; a lower alkyl group having 1 to 5 carbon atoms, such as methyl group and ethyl group; an aryl group having 6 to 20 carbon atoms, such as phenyl group; an alkoxy group having 1 to 20 carbon atoms, such as methoxy group. Among them, methyl group is preferable. $Z^1$ is preferably a monovalent dimethylsiloxane polymer residue having a number-average molecular weight of 500 to 5000. $q_1$ is 0 or 1, and preferably 1. $r_1$ is an integer of 1 to 3, and preferably 1.

Representative examples of the silicone macromer include a silicone macromer represented by the formula (VIII-1):

$$CH_2=CR^5-COOC_3H_6-[Si(R^6)_2-O]_{b1}-Si(R^6)_3 \quad (VIII-1)$$

wherein $R^5$ is hydrogen atom or methyl group; each of $R^6$ is independently hydrogen atom or a lower alkyl group having 1 to 5 carbon atoms; and $b_1$, is a number of 5 to 60; a silicone macromer represented by the formula (VIII-2):

$$CH_2=CR^5-COO-[Si(R^6)_2-O]_{b1}-Si(R^6)_3 \quad (VIII-2)$$

wherein $R^5$, $R^6$ and $b_1$ are as defined above; a silicone macromer represented by the formula (VIII-3):

$$CH_2=CR^5-Ph-[Si(R^6)_2-O]_{b1}-Si(R^6)_3 \quad (VIII-3)$$

wherein Ph is phenylene group; and $R^5$, $R^6$ and $b_1$ are as defined above; a silicone macromer represented by the formula (VIII-4):

$$CH_2=CR^5-COOC_3H_6-Si(OE)_3 \quad (VIII-4)$$

wherein $R^5$ is as defined above; E is a group represented by $-[Si(R^5)_2O]_{c1}-Si(R^5)_3$, wherein $R^5$ is as defined above; and $c_1$ is a number of 5 to 65; and the like.

Among them, the silicone macromer represented by the formula (VIII-1) is preferable, and a silicone macromer represented by the formula (VIII-1a):

$$CH_2=C(CH_3)-COOC_3H_6-[Si(CH_3)_2-O]_{d1}-CH_3 \quad (VIII-1a)$$

wherein $d_1$ is a number of 8 to 40,
 is particularly preferable. Examples of the silicone macromer include a silicone macromer commercially available from CHISSO CORPORATION under the trade name of FM-0711 and the like.

The styrenic macromer can be favorably used, since the pigment can be sufficiently contained in the vinyl polymer.

The styrenic macromer includes styrene homopolymers having a polymerizable functional group at one end, and copolymers of styrene with the other monomer. Among them, those having acryloyloxy group or methacryloyloxy group as a polymerizable functional group at one end are preferable. It is desired that the content of styrene in the copolymer is not less than 60% by weight, preferably not less than 70% by weight, from the viewpoint of sufficiently containing the pigment in the vinyl polymer. The other monomer includes acrylonitrile and the like.

The component (c) includes (meth)acrylates such as methyl (meth)acrylate, ethyl (meth)acrylate, (iso)propyl (meth)acrylate, (iso- or tertiary-)butyl (meth)acrylate, (iso) amyl (meth)acrylate, cyclohexyl (meth)acrylate, benzyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate; styrenic monomers such as styrene, vinyltoluene, 2-methylstyrene and chlorostyrene; and the like. These can be used alone or in admixture of at least two kinds. Incidentally, (iso- or tertiary-) and (iso) mentioned above include both cases where these groups are present and where they are absent. In the case where these groups are absent, each of the listed compounds has a normal form.

It is preferable that the component (c) contains a styrenic monomer from the viewpoint of giving a water-based ink composition improved printed density and high-lighter fastness. As the styrenic monomer, styrene and 2-methylstyrene are preferable. These styrenic monomers can be used alone or in admixture thereof. In this case, it is desired that the content of the styrenic monomer in the component (c) is 10 to 100% by weight, preferably 40 to 100% by weight, from the viewpoints of giving a water-based ink composition improved printed density and high-lighter fastness.

The component (d) includes 2-hydroxyethyl (meth) acrylate, 3-hydroxypropyl (meth)acrylate, polyethylene glycol(n=2 to 30) (meth)acrylate, poly(ethylene glycol(n=1 to 15)-propylene glycol(n=1 to 15)) (meth)acrylate and the like. Among them, 2-hydroxyethyl (meth)acrylate is preferable.

The component (e) increases the jetting stability of the water-based ink composition of the present invention, and suppresses the generation of crookedness even when printing is continuously carried out.

It is desired that the content of the component (a) in the vinyl polymer is 1 to 50% by weight, preferably 2 to 40% by weight, from the viewpoint of dispersion stability of the dispersion obtained.

It is desired that the content of the component (b) in the vinyl polymer is 1 to 25% by weight, preferably 5 to 20% by weight, from the viewpoint of suppression of scorching on heater surface of inkjet printer and from the viewpoint of stability.

It is desired that the content of the component (c) in the vinyl polymer is 5 to 93% by weight, preferably 10 to 80% by weight, from the viewpoint of suppression of scorching on heater surface of inkjet printer and from the viewpoint of stability. When the component (c) comprising a styrenic monomer is used, it is preferable that the content of the component (c) in the vinyl polymer is 10 to 60% by weight.

It is desired that the content of the component (d) in the vinyl polymer is 5 to 40% by weight, preferably 7 to 20% by weight, from the viewpoints of jetting stability and printed density. It is desired that the total content of the component (a) and the component (d) is 6 to 60% by weight, preferably 10 to 50% by weight, from the viewpoints of stability in water and water resistance.

It is desired that the content of the component (e) in the vinyl polymer is 5 to 50% by weight, preferably 10 to 40% by weight, from the viewpoints of jetting stability and suppression of the generation of crookedness when printing is continuously carried out.

It is preferable that the total content of the component (a) and the component (e) in the vinyl polymer is 6 to 75% by weight, from the viewpoints of dispersion stability in water and jetting stability.

In addition, it is desired that the total content of the component (a), the component (d) and the component (e) in the vinyl polymer is 6 to 60% by weight, preferably 7 to 50% by weight, from the viewpoints of dispersion stability in water and jetting stability.

The vinyl polymer can be prepared by copolymerizing the monomer mixture by means of a known polymerization method such as bulk polymerization, solution polymerization, suspension polymerization, or emulsion polymerization. Among these polymerization methods, solution polymerization method is preferable.

The solvent used in the solution polymerization method is preferably a polar organic solvent, and a water-miscible organic solvent can also be used by mixing with water. The organic solvent includes, for instance, an aliphatic alcohol having 1 to 3 carbon atoms, such as methanol, ethanol and propanol; ketones such as acetone and methyl ethyl ketone; esters such as ethyl acetate; and the like. Among them, methanol, ethanol, acetone, methyl ethyl ketone, or a liquid mixture thereof with water is preferable.

A radical polymerization initiator can be used during the polymerization. As the radical polymerization initiator, azo compounds such as 2,2'-azobisisobutyronitrile, 2,2'-azobis (2,4-dimethylvaleronitrile), dimethyl-2,2'-azobisbutyrate, 2,2'-azobis(2-methylbutyronitrile), and 1,1'-azobis(1- cyclohexanecarbonitrile) are preferable. In addition, organic peroxides such as t-butyl peroxyoctoate, di-t-butyl peroxide and dibenzoyl oxide can be used as a radical polymerization initiator.

It is preferable that the amount of the polymerization initiator is 0.001 to 5% by mol, particularly 0.01 to 2% by mol of the monomer mixture.

During the polymerization, a polymerization chain transfer agent can be further added. Concrete examples of the polymerization chain transfer agent include mercaptans such as octyl mercaptan, n-dodecyl mercaptan, t-dodecyl mercaptan, n-tetradecyl mercaptan and mercaptoethanol; xanthogenndisulfides such as dimethyl xanthogenndisulfide and diisopropyl xanthogenndisulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, $\alpha$-terpinene, $\gamma$-terpinene, diterpene, $\alpha$-methylstyrene dimer, 9,10-dihydroanthracene, 1,4-dihydronaphthalene, indene and 1,4-cyclohexadiene; unsaturated heterocyclic compounds such as 2,5-dihydrofuran; and the like. Those can be used alone or in admixture of at least two kinds.

The conditions for polymerizing the monomer mixture differ depending upon kinds of the radical polymerization initiator, monomer and the solvent. It is preferable that the polymerization temperature is usually 30° to 100° C., preferably 50° to 80° C., and that the polymerization time period is usually 1 to 20 hours. In addition, it is preferable that the polymerization atmosphere is an atmosphere of an inert gas such as nitrogen gas.

After termination of the polymerization reaction, the resulting copolymer can be isolated from the reaction solution by a known method such as re-precipitation or distilling off of the solvent. The copolymer can be purified by the removal of unreacted monomers and the like by the repeat of re-precipitation, membrane separation, chromatography or extraction.

It is preferable that the weight-average molecular weight of the polymer is 3000 to 100000, from the viewpoints of durability after printing and dispersion stability.

The aqueous dispersion of the polymer particles containing the hydrophobic dye can be prepared by a known emulsification process. For instance, the aqueous dispersion can be obtained by dissolving a polymer and a hydrophobic dye in an organic solvent, adding a neutralizing agent as occasion demands to ionize a salt-forming group in the polymer, adding water to the resulting mixture, thereafter emulsifying with a dispersion device or a sonication emulsifier as occasion demands, and distilling off the organic solvent to phase-invert to a water-based system.

In addition, as a process for preparing an aqueous dispersion of the polymer particles containing a pigment, it is preferable to employ a process comprising dissolving a polymer in an organic solvent; adding a pigment, water and a neutralizing agent, and a surfactant as occasion demands to the resulting solution; kneading the mixture to form a paste; thereafter diluting the resulting paste with water as occasion demands; and distilling off the organic solvent from the mixture to give an aqueous dispersion.

The neutralizing agent can be a known acid or base depending upon the kind of the salt-forming group. As the acid and base, those listed as neutralizing agents for the cationic monomer component and the anionic monomer component can be used.

The amount of the coloring agent in the polymer particles is preferably 20 to 900 parts by weight, more preferably 20 to 400 parts by weight, still more preferably 100 to 400 parts by weight, based on 100 parts by weight of solid contents of the polymer, from the viewpoints of printed density and facilitation of containing the hydrophobic dye or pigment into the polymer particles.

In addition, it is preferable that the particle diameter of the polymer particles in the aqueous dispersion of the polymer particles comprising the dye and/or pigment is 0.01 to 0.5 $\mu$m, from the viewpoint of dispersion stability.

The content of the coloring agent in the water-based ink composition is not limited to specified ones, as long as sufficient printed density can be obtained in a composition containing a polybasic acid. It is desired that the content of the coloring agent is usually 1 to 15% by weight, preferably 2 to 10% by weight, more preferably 4 to 8% by weight.

In the water-based ink composition containing a polybasic acid, the polymer particles in which a pigment or dye is contained in a vinyl polymer of which component (a) is a cationic monomer can be preferably used, from the viewpoint of giving the water-based ink composition improved printed density.

The water-based ink composition of the present invention may contain various kinds of known additives, for instance, a wetting agent such as a polyhydric alcohol, a dispersant, a defoaming agent, a mildewproof agent, a chelating agent, a pH adjusting agent and the like.

EXAMPLES

The units "parts" and "%" as used in each example are based upon weight.

Preparation Example 1

Colorant: Preparation of Aqueous Dispersion of Polymer Particles Containing Carbon Black (1) Preparation of Polymer A 1-L flask equipped with a mechanical stirrer, a thermometer, a nitrogen gas inlet tube, a reflux condenser and a dropping funnel was sufficiently replaced with nitrogen gas. Thereafter, the flask was charged with 45.0 g of styrene, 17.0 g of lauryl methacrylate, 45.0 g of N,N-dimethylaminoethyl methacrylate, 55.0 g of methoxypolyethylene glycol (n=4) methacrylate, 20.0 g of a styrene macromer commercially available from TOAGOSEI CO., LTD., under the trade name of "AS-6" and 0.8 g of mercaptoethanol, and the temperature was raised to 65° C.

Next, a mixed solution of 40.0 g of styrene, 20.0 g of lauryl methacrylate, 60.0 g of N,N-dimethylaminoethyl methacrylate, 70.0 g of methoxypolyethylene glycol (n=4) methacrylate, 20.0 g of a styrene macromer commercially available from TOAGOSEI CO., LTD., under the trade name of "AS-6", 7.2 g of mercaptoethanol, 2.4 g of azobis-dimethylvaleronitrile and 18 g of methyl ethyl ketone was added dropwise to the flask over a period of 2.5 hours.

After the termination of the dropwise addition, a mixed solution of 0.8 g of azobisdimethylvaleronitrile and 18 g of methyl ethyl ketone was added dropwise to the flask over a period of 0.5 hours. After the mixture was matured at 65° C. for 1 hour, 0.8 g of azobisdimethylvaleronitrile was added thereto, and the mixture was matured for additional one hour.

After the termination of the reaction, 364 g of methyl ethyl ketone was added to the flask, to give 800 g of a polymer solution, the concentration of which was 50%.

A portion of the polymer solution was dried at 150° C. under reduced pressure for 2 hours to isolate the polymer. Its weight-average molecular weight was determined by gel permeation chromatography using polystyrene as a standard substance, and chloroform containing dodecyldimethylamine of 1 mmol/L as a solvent. As a result, the weight-average molecular weight was 13000.

(2) Preparation of Aqueous Dispersion of Polymer Particles Containing Carbon Black Twenty-eight grams of the polymer solution obtained in the above item (1), 16 g of carbon black commercially available from Cabot Corporation, under the trade name of "Monarch 880", 11.1 g of a 1 mol/L aqueous acetic acid, 20 g of methyl ethyl ketone and 30 g of ion-exchanged water were sufficiently stirred. Thereafter, the mixture was kneaded for 20 times using a triple roller mill commercially available from NORITAKE CO., LIMITED, under the trade name of "NR-84A", to give a paste.

The paste was added to 200 g of ion-exchanged water, and the mixture was sufficiently stirred. Thereafter, methyl ethyl ketone and water were distilled off using an evaporator, to give 160 g of an aqueous dispersion of polymer particles containing carbon black, the solid content of which was 20.0% by weight. The average particle diameter of the polymer particles was determined by using a COULTER N4 (trade name, commercially available from Beckman Coulter, Inc.). As a result, the average particle diameter was 133 nm.

Preparation Example 2
Preparation of Anionic Polymer Emulsion

The same procedures as in the above item (1) of Preparation Example 1 were carried out, to give a 50% methyl ethyl ketone solution of a styrene-butyl methacrylate-styrene macromer(commercially available from TOAGOSEI CO., LTD., under the trade name of "AS-6")-methacrylic acid copolymer [styrene/butyl methacrylate/styrene macromer/methacrylic acid (weight ratio): 30/20/10/40], the weight-average molecular weight (measured by using tetrahydrofuran containing acetic acid of 50 mmol/L as a solvent) of which was 7000. Forty-eight grams of a 1 mol/L aqueous sodium hydroxide was added to 28 g of this solution to neutralize the salt-forming group of the polymer. Two-hundred grams of ion-exchanged water and 50 g of carbon black commercially available from Degussa under the trade name of Printex 95 were added thereto, and the mixture was stirred. Thereafter, the mixture was kneaded for 20 times using a triple roller mill to give a paste.

The paste was added to 200 g of ion-exchanged water, and the mixture was sufficiently stirred. Thereafter, methyl ethyl ketone and water were distilled off using an evaporator, to give 160 g of an aqueous dispersion of polymer particles containing carbon black, the solid content of which was 20.0% by weight. The average particle diameter of the polymer particles was determined by using a COULTER N4 (trade name, commercially available from Beckman Coulter, Inc.). As a result, the average particle diameter was 98 nm.

Preparation Example 3
Preparation of Cationic Polymer Emulsion

The same procedures as in the above item (1) of Preparation Example 1 were carried out, to give a 50% methyl ethyl ketone solution of a styrene4lauryl methacrylate-N,N-dimethylaminoethyl methacrylate copolymer [styrene/lauryl methacrylate/N,N-dimethylaminoethyl methacrylate (weight ratio): 40/15/45], the weight-average molecular weight of which was 16000. To 28 g of this solution was added 40.0 g of a 1 mol/L aqueous acetic acid to neutralize the salt-forming group of the polymer. Two-hundred grams of ion-exchanged water was added thereto, and the mixture was stirred. Thereafter, the mixture was emulsified for 30 minutes with Microfluidizer commercially available from Microfluidics International Corporation to give an emulsion.

The emulsion was concentrated by removing the organic solvent at 60° C. under reduced pressure, and further removing water, to give a cationic polymer emulsion, the solid content of which was 20% by weight. The average particle diameter of the polymer particles contained in the polymer emulsion was determined by using a COULTER N4 (trade name, commercially available from Beckman Coulter, Inc.). As a result, the average particle diameter was 96 nm.

Preparation Example 4
Preparation of Cationic Polymer Solution)

The same procedures as in the above item (1) of Preparation Example 1 were carried out, to give a 50% methyl ethyl ketone solution of a styrene-N,N-dimethylaminoethyl methacrylate copolymer [styrene/N,N-dimethylaminoethyl methacrylate (weight ratio): 40/60], the weight-average molecular weight of which was 7000. To 28 g of this solution was added 53.3 g of a 1 mol/L aqueous acetic acid to neutralize the salt-forming group of the polymer. Two-hundred grams of ion-exchanged water was added thereto, and the solution was stirred.

The resulting solution was concentrated by removing the organic solvent at 60° C. under reduced pressure, and further removing water, to give a cationic polymer solution, the solid content of which was 20% by weight.

Example 1

10 grams of 2-pyrrolidone, 5 g of glycerol, 5 g of polyethylene glycol (molecular weight: 1000), 1 g of isopropanol, 41 g of ion-exchanged water and 30 g of the aqueous dispersion of polymer particles containing carbon black obtained in Preparation Example 1 as a colorant were mixed. Thereafter, a 20% aqueous malonic acid was added to give an ink composition having a pH value of 4.0. The resulting liquid mixture was filtered with a membrane filter commercially available from Fuji Photo Film Co., Ltd. under the trade name of Disk Capsule CAL80, to give a water-based ink composition.

Example 2

The same procedures as in Example 1 were carried out except that a 20% aqueous polyethylene glycol dicarboxylic acid (molecular weight: 400) was added in place of the 20% aqueous malonic acid for adjusting a pH value, to give a water-based ink composition.

Example 3

The same procedures as in Example 1 were carried out except that a 20% aqueous acetic acid was firstly added for adjusting a pH value to 4.5, and thereafter a 20% aqueous malonic acid was added for adjusting a pH value to 3.8, to give a water-based ink composition.

Example 4

The same procedures as in Example 1 were carried out except that 3 g of the cationic polymer emulsion obtained in Preparation Example 3 was further added before adjusting a pH value of the ink composition, to give a water-based ink composition.

Example 5

The same procedures as in Example 1 were carried out except that 3 g of the cationic polymer emulsion obtained in Preparation Example 4 was further added before adjusting a pH value of the ink composition, to give a water-based ink composition.

Example 6

The same procedures as in Example 1 were carried out except that 30 g of the aqueous dispersion of polymer particles containing carbon black obtained in Preparation Example 2 as a colorant was used, and that a 20% aqueous malonic acid was added for adjusting a pH value of the ink composition to 7.2, to give a water-based ink composition.

Comparative Example 1

The same procedures as in Example 1 were carried out except that a 20% aqueous acetic acid was added in place of the 20% aqueous malonic acid for adjusting a pH value of an ink composition, to give a water-based ink composition.

EVALUATION METHODS (1) Printed Density

Solid image printing (100% duty, length: 100 mm, width: 50 mm) was carried out on an A4 regenerated paper for PPC commercially available from Nippon Kako Seishi K.K. using a bubble jet printer commercially available from Hewlett Packard Co., under the trade name of "Desk Jet 720C", and the printed image was allowed to stand at 25° C. for 24 hours, and thereafter its optical density was determined by using a densitometer commercially available from Macbeth Process Measurements Co. under the trade name of RD918.

(2) Discharging Ability

Continuous printing was carried out using the same printer and regenerated paper as used in the evaluation of Printed Density mentioned above, to give 10 sheets of solid image-printed (100% duty, width: 190 mm and length: 270 mm) paper.

Thereafter, a test document including characters (font: 12 point, 35 characters/line, number of lines: 10), solid image printing (100% duty, length: 190 mm, width: 50 mm) and ruled lines (3 ruled lines having a line width of 0.5 mm and a length of 190 mm, and 3 ruled lines having a line width of 1 mm and a length of 190 mm) were printed, to evaluate discharging ability. The evaluation criteria are as follows:

Evaluation Criteria

⊚: Satisfactory in all of three items of sharp and clear characters, uniform solid image printing, and no crookedness of printed ruled lines ○: Almost satisfactory in three items of sharp and clear characters, uniform solid image printing, and no crookedness of printed ruled lines Δ: Unsatisfactory in one of three items of sharp and clear characters, uniform solid image printing, and no crookedness of printed ruled lines ×: Unsatisfactory in at least two items of three items of sharp and clear characters, uniform solid image printing, and no crookedness of printed ruled lines (3) Water Resistance Solid image printing (100% duty; length: 100 mm, width: 50 mm) was carried out on the regenerated paper for PPC used in the evaluation of Printed Density mentioned above by using the above printer, and dried at 25° C. for 1 hour. The printed density of the specified printed portion of the obtained sample was determined, and thereafter the printed copy paper was immersed in stand-still water for 10 seconds, and the paper was lifted vertically therefrom. After air-drying the paper at 25° C. for 24 hours, the printed density of the same printed portion as that before immersion was measured, and the residual ratio of the printed density after immersion to the printed density immediately after solid image printing was determined. The water resistance was evaluated on the basis of the following evaluation criteria:

Evaluation Criteria

⊚: Residual ratio being not less than 95%

○: Residual ratio being not less than 90% and less than 95%

Δ: Residual ratio being not less than 70% and less than 90%

×: Residual ratio being less than 70%

(4) High Lighter-fastness

Text printing was carried out on the regenerated paper for PPC used in the evaluation of Printed Density mentioned above by using the above printer. After the plain paper was allowed to stand for 6 hours at 25° C., the extent of staining of the printed sample when traced with an aqueous fluorescent marker commercially available from PILOT CORPORATION, under the trade name of "Spotlighter" was observed with naked eyes, and the evaluation was made on the basis of the following evaluation criteria:

Evaluation Criteria

⊚: No staining such as rubbed stains was observed even when traced with a fluorescent marker.

○: Some rubbed stains which would cause no problems in practical uses were generated when traced with a fluorescent marker.

×: Generation of rubbed stains was observed when traced with a fluorescent marker, which was intolerable.

(5) Rubbing Resistance

Solid image printing (100% duty, length: 100 mm, width: 50 mm) was carried out on the regenerated paper for PPC using the above printer. After the copy paper was dried at 25° C. for 24 hours, the printed surface was strongly rubbed with a finger. The extent of rub-off of the printed image was evaluated by the following evaluation criteria:

Evaluation Criteria

⊚: Substantially no printed image being rubbed off, and its periphery not being stained ○: Some printed images being rubbed off, its periphery being slightly stained, and finger also being slightly stained ×: Printed images being considerably rubbed off, its periphery being considerably stained, and finger also being considerably stained

TABLE 1

| | Printed Density | Discharging Ability | Water Resistance | High Lighter-Fastness | Rubbing Resistance |
|---|---|---|---|---|---|
| Ex. 1 | 1.50 | ○ | ○ | ○ | ○ |
| Ex. 2 | 1.49 | ○ | ○ | ○ | ○ |
| Ex. 3 | 1.47 | ○ | ○ | ○ | ○ |
| Ex. 4 | 1.46 | ○ | ⊚ | ⊚ | ⊚ |
| Ex. 5 | 1.46 | ⊚ | ○ | ○ | ○ |
| Ex. 6 | 1.49 | ○ | ○ | ○ | ⊚ |
| Comp. Ex. 1 | 1.23 | ○ | ○ | ○ | ○ |

It can be seen from the results shown in Table 1 that the water-based ink composition obtained in each example is excellent in printed density, discharging ability, water resistance, high lighter-fastness and rubbing resistance.

What is claimed is:

1. A water-based ink composition, comprising:
a polybasic acid selected from the group consisting of polyethylene oxide dicarboxylic acid and glycerol dicarboxylic acid,
a water-insoluble cationic polymer,
a coloring agent, and
a monovalent acid having a water-solubility of not less than 10% by weight at 20° C.,
wherein the composition contains dispersed therein water-insoluble particles comprising the water-insoluble cationic polymer and the coloring agent.

2. The water-based ink composition according to claim 1, wherein the water-insoluble cationic polymer is a vinyl polymer prepared by copolymerizing a monomer mixture comprising (a) a monomer having a salt-forming group, (b) a macromer, and (c) a monomer copolymerizable with the monomer having a salt-forming group and the macromer.

3. The water-based ink composition according to claim 1 or 2, further comprising at least one of an ionic polymer which is solubilized in the composition and an ionic polymer which is emulsified in the composition.

4. The water-based ink composition according to claim 1, wherein the polybasic acid is polyethylene oxide dicarboxylic acid.

5. The water-based ink composition according to claim 1, wherein the polybasic acid is glycerol dicarboxylic acid.

6. The water based ink composition according to claim 1, which contains 0.01 to 20% by weight of the water-insoluble cationic polymer.

7. The water-based ink composition according to claim 1, which has a pH of 3 to 7.

8. The water-based ink composition according to claim 1, wherein the coloring agent is a pigment.

9. The water-based ink composition according to claim 1, wherein the coloring agent is a dye.

10. The water-based ink composition according to claim 1, wherein the composition contains 0.5 to 20% by weight of the coloring agent.

11. The water-based ink composition according to claim 1, wherein the diameter of the water-insoluble particles is 0.01 to 0.5 μm.

12. A water-based ink composition, comprising:
a polybasic acid selected from the group consisting of malonic acid, a polyethylene oxide dicarboxylic acid, and glycerol dicarboxylic acid,
0.01 to 20% by weight of a water-insoluble ionic polymer, and
a pigment,
wherein the composition contains dispersed therein water-insoluble particles comprising the water-insoluble ionic polymer and the pigment.

13. The water-based ink composition according to claim 12, wherein the water-insoluble ionic polymer is a vinyl polymer prepared by copolymerizing a monomer mixture comprising (a) a monomer having a salt-forming group, (b) a macromer, and (c) a monomer copolymerizable with the monomer having a salt-forming group and the macromer.

14. The water-based ink composition according to claim 12 or 13, further comprising at least one of an ionic polymer which is solubilized in the composition and an ionic polymer which is emulsified in the composition.

15. The water-based ink composition according to claim 12, wherein the polybasic acid is malonic acid.

16. The water-based ink composition according to claim 12, wherein the polybasic acid is polyethylene oxide dicarboxylic acid.

17. The water-based ink composition according to claim 12, wherein the polybasic acid is glycerol dicarboxylic acid.

18. The water-based ink composition according to claim 12, which has a pH of 3 to 7.

19. The water-based ink composition according to claim 12, which has a pH of 6 to 12.

20. The water-based ink composition according to claim 12, wherein the composition contains 0.5 to 20% by weight of the pigment.

21. The water-based ink composition according to claim 12, wherein the diameter of the water-insoluble particles is 0.01 to 0.5 μm.

22. A water-based ink composition, comprising:
a polybasic acid selected from the group consisting of a polyethylene oxide dicarboxylic acid and glycerol dicarboxylic acid,
a water-insoluble ionic polymer, and
a coloring agent.

23. The water-based ink composition according to claim 22, wherein the ionic polymer is a cationic polymer, and the water-based ink composition further comprises a monovalent acid having a water-solubility of not less than 10% by weight at 20° C.

24. The water-based ink composition according to claim 22, wherein the coloring agent is a pigment.

25. The water-based ink composition according to claim 22, which contains dispersed therein water-insoluble particles comprising the water-insoluble ionic polymer and the coloring agent.

26. The water-based ink composition according to claim 25, wherein the ionic polymer is a vinyl polymer prepared by copolymerizing a monomer mixture comprising (a) a monomer having a salt-forming group, (b) a macromer, and (c) a monomer copolymerizable with the monomer having a salt-forming group and the macromer.

27. The water-based ink composition according to claim 25 or 26, further comprising at least one of an ionic polymer which is solubilized in the composition and an ionic polymer which is emulsified in the composition.

28. The water-based ink composition according to claim 25, wherein the diameter of the water-insoluble particles is 0.01 to 0.5 μm.

29. The water-based ink composition according to claim 22, wherein the polybasic acid is polyethylene oxide dicarboxylic acid.

30. The water-based ink composition according to claim 22, wherein the polybasic acid is glycerol dicarboxylic acid.

31. The water-based ink composition according to claim 22, which contains 0.01 to 20% by weight of the ionic polymer.

32. The water-based ink composition according to claim 22, which has a pH of 3 to 7.

33. The water-based ink composition according to claim 22, which has a pH of 6 to 12.

34. The water-based ink composition according to claim 22, wherein the composition contains 0.5 to 20% by weight of the coloring agent.

* * * * *